United States Patent [19]

Mathis

[11] 4,185,004
[45] Jan. 22, 1980

[54] MULTI-COMPONENT STABILIZING SYSTEM FOR PIGMENTED POLYOLEFINS

[75] Inventor: Ronald D. Mathis, Bartlesville, Okla.

[73] Assignee: Phillips Petroleum Company, Bartlesville, Okla.

[21] Appl. No.: 791,442

[22] Filed: Apr. 27, 1977

[51] Int. Cl.$^2$ .................. C08K 5/34; C08K 5/36; C08K 5/49; C08K 5/52

[52] U.S. Cl. .................. 260/45.8 NT; 252/400 A; 252/402; 252/403; 252/404; 260/42.45; 260/45.7 PS; 260/45.8 R; 260/45.85 S; 260/45.85 T; 260/45.95 C

[58] Field of Search .............. 260/45.7 PS, 42.45, 260/45.8 R (U.S. only); 252/400 A, 404 (U.S. only)

[56] References Cited

U.S. PATENT DOCUMENTS

| | | | |
|---|---|---|---|
| 3,039,993 | 6/1962 | Friedman | 260/45.7 PH |
| 3,256,237 | 6/1966 | Casey | 260/45.7 PS |
| 3,274,146 | 9/1966 | Lecher | 260/45.7 PS |
| 3,278,483 | 10/1966 | Wright et al. | 260/45.7 PS |
| 3,607,828 | 9/1971 | Hussey | 260/45.75 N |
| 3,637,582 | 1/1972 | Gilles | 260/45.8 NT |
| 3,810,929 | 5/1974 | Song | 260/45.95 C |
| 3,909,491 | 9/1975 | Gilles | 260/45.7 PS |
| 3,922,249 | 11/1975 | Mills | 260/45.8 R |
| 3,966,675 | 6/1976 | Schurdak et al. | 260/45.8 NT |
| 3,975,358 | 9/1976 | Stretanski | 260/45.8 R |
| 4,025,486 | 5/1977 | Gilles | 260/45.8 R |
| 4,028,332 | 6/1977 | Needham et al. | 260/45.8 R |

*Primary Examiner*—Howard E. Schain
*Assistant Examiner*—R. A. White

[57] ABSTRACT

A multi-component ultraviolet stabilizer system for pigmented polyolefins comprising a tris-(4-hydroxybenzyl) isocyanurate, a substituted pentaerythritol phosphite, and a trihydrocarbyl thiophosphite. In an alternate embodiment the stabilizer system also comprises a thiomethylenephenol.

12 Claims, No Drawings

MULTI-COMPONENT STABILIZING SYSTEM FOR PIGMENTED POLYOLEFINS

BACKGROUND OF THE INVENTION

This invention relates to stabilization of polyolefins. In one of its aspects this invention relates to the stabilization of pigmented polyolefins. In another of its aspects this invention relates to ultraviolet stabilazation of pigmented polyolefin. In still another aspect of this invention it relates to stabilizer systems for polymers of propylene.

In one of its concepts this invention relates to a multi-component additive system which provides stabilization against ultraviolet deterioration for homopolymers of propylene and copolymers of propylene and another aliphatic 1-olefin containing 2-8 carbon atoms in which the comonomer constitutes up to about 20 mol percent of the copolymer.

It has been well known in the art that pigmented polyolefins, particularly polymers of propylene, can be stabilized against ultraviolet deterioration using nickel-base stabilizing compositions. These stabilizers have proved effective, but they are expensive and in some applications a green color is imparted to the resin which must be masked using other pigments. Considerable effort has, therefore, been expended to develop pigmented polymers of propylene which are readily melt spun into fibers and which possess sufficient stability to ultraviolet light and oxidative degradation with the use of ultraviolet stabilizers other than nickel-base compounds.

It is therefore an object of this invention to provide an ultraviolet stabilizer system for pigmented polyolefins. It is also an object of this invention to provide a stabilized pigmented polyolefin composition, especially a stabilized composition comprising a polymer of propylene. It is still another object of this invention to provide a method for stabilizing a pigmented polyolefin, particularly a polymer of propylene.

Other objects, aspects, and the various advantages of this invention will become apparent upon reading this specification and the appended claims.

STATEMENT OF THE INVENTION

Normally solid, pigmented polyolefins, particularly such polymers of propylene as polypropylene and copolymers of propylene and another aliphatic 1-olefin containing 2-8 carbon atoms in which the comonomer constitutes up to about 20 mol percent of the copolymer, are stabilized against ultraviolet degradation with the multi-component stabilizing system of this invention. The stabilizing system comprises a phenolic antioxidant, an organic phosphite, an organic thiophosphite, and optionally a thiomethylenephenol. Other additives such as processing aids and other pigments, for example, can be used, providing they do not interact antagonistically with the stabilizing system for polymers of this invention.

Suitable phenolic antioxidants are selected from tris-(4-hydroxybenzyl) isocyanurates disclosed in U.S. Pat. No. 3,637,582. These compounds encompass tris-(4-hydroxybenzyl) isocyanurates which are known to be excellent stabilizers for organic materials that are subject to oxidative, thermal, and ultraviolet degradation. Of the typical tris-(4-hydroxybenzyl) isocyanurates a presently preferred compound is tris-(3,5-di-t-butyl-4-hydroxybenzyl) isocyanurate.

Suitable phosphites contemplated in this invention are substituted pentaerythritol phosphites described by the generic formula:

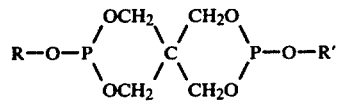

described in U.S. Pat. No. 3,922,249, where R and R' are the same or different and are selected from the group consisting of alkyl, cycloalkyl, aryl, alkoxyalkyl, the halo-substituted derivatives thereof containing from 1 to 20 carbon atoms and combinations thereof such as aralkyl, alkaryl, and the like. Of the well-known substituted pentaerythritol phosphites a preferred compound is distearyl pentaerythritol diphosphite (3,9-di(octadecyloxy)-2,4,8,10-tetraoxa-3,9-diphosphaspiro[5,5]undecane). Such a compound can itself be stabilized against hydrolysis by the addition of a small amount, e.g., about 1 wt. percent, of a suitable amine such as triisopropanolamine.

The thiophosphites envisioned in this invention are trihydrocarbyl thiophosphites described by the generic formula:

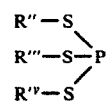

wherein R", R'" and R'$^v$ are the same or different alkyl, cycloalkyl or aryl groups containing from 1–20 carbon atoms per molecule and combinations thereof such as aralkyl. Examples include trimethyl trithiophosphite, trilauryl trithiophosphite, trieicosyl trithiophosphite, tricyclohexyl trithiophosphite, triphenyl trithiophosphite, phenyl distearyl trithiophosphite, diphenyl lauryl trithiophosphite, and the like. Trilauryl trithiophosphite is presently preferred.

The quantities of each stabilizer component in parts by weight per 100 parts by weight polymer (php) used in the polymeric compositions are chosen from within the range of about 0.10 to about 0.60 tris-(4-hydroxybenzyl) isocyanurate, about 0.02 to about 0.3 phosphite, and from about 0.02 to about 0.3 thiophosphite. It has been found that a more preferred range of quantities for each stabilizer is about 0.15 to about 0.5 tris-(4-hydroxybenzyl) isocyanurate, about 0.03 to about 0.15 phosphite, and about 0.03 to about 0.25 thiophosphite, with the best stabilization occurring within the range of about 0.2 to about 0.3 tris-(4-hydroxybenzyl) isocyanurate, about 0.04 to about 0.12 phosphite, and about 0.05 to about 0.15 thiophosphite.

Processing aids (lubricants), e.g., metal salts of fatty acids containing from about 10 to about 20 carbon atoms per molecule, can be desirably employed in minor amounts, generally from about 0.01 to about 0.5 php, in admixture with the stabilized compositions. The metals are selected from Periodic Groups IA, IIA, and IIB. Representative compounds include sodium decanoate, potassium laurate, calcium stearate, zinc palmitate, sodium eicosanoate, and the like and mixtures thereof. Calcium stearate is presently preferred.

One or more phenolic antioxidants used as oxidative and thermal stabilizers can be optionally included in the stabilized compositions of this invention. Representative antioxidants include 2,6-di-t-butyl-4-methylphenol (BHT), octadecyl[3-(3,5-di-t-butyl-4-hydroxyphenyl)]-propionate, di-n-octadecyl (3,5-di-t-butyl-4-hydroxybenzyl) phosphonate, tetrakis[methylene (3,5-di-t-butyl-4-hydroxyhydrocinnamate)]methane, 2,4-bis(4-hydroxy-3,5-di-t-butyl-phenoxy)-6-(n-octylthio)-1,3,5-triazine and 1,3,5-trimethyl-2,4,6-tris(3,5-di-t-butyl-4-hydroxybenzyl) benzene. The supplementary antioxidants, when employed, are used in minor amounts, generally ranging from about 0.01–0.1 php.

In one embodiment of the invention it has been discovered that for polymers suitable for use in preparing fibers, particularly fibers that will be heat treated, heat stability of pigmented compositions of polymers of propylene that can be stabilized for ultraviolet degradation using a combination of tris-(4-hydroxybenzyl) isocyanurates, substituted pentaerythritol phosphite, and trihydrocarbyl thiophosphite can be enhanced by the addition of a thiomethylenephenol. Suitable thiomethylenephenols for use in this invention include compounds of the formula

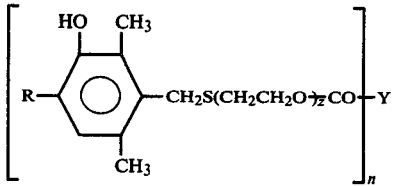

in which R is a branched-chain alkyl of 3 to 12 carbon atoms, z is zero or 1, n is a whole number from 2 to 4, and Y is the residue of the organic carboxylic acid $Y(COOH)_n$ as shown in U.S. Pat. No. 3,810,929. A thiomethylenephenol presently preferred is bis(4-t-butyl-3-hydroxy-2,6-dimethylbenzyl)dithiolterephthalate. The thiomethylenephenol should be present in the amount of about 0.02 to about 0.2 php, preferably about 0.04 to about 0.15 php.

Pigments and dyes normally used in coloring polyolefins can be included in conventional amounts in the stabilized compositions of this invention. Fibers prepared from the pigmented and stabilized compositions of this invention exhibit greater UV stability than unpigmented control fibers. This behavior contrasts with fibers prepared from similarly pigmented compositions containing different stabilizer components and one or more UV stabilizers selected from among the nickel-containing and nickel-free types. Fibers prepared from such prior art pigmented compositions exhibit poorer resistance to UV light than the unpigmented control.

EXAMPLE I

A pigmented and stabilized composition was prepared by mixing a sample of 12 melt flow polypropylene at about 375°–400° F. (190°–204° C.) with 0.12 parts by weight of tris-(3,5-di-t-butyl-4-hydroxybenzyl) isocyanurate (abbreviated 4-HBI) per 100 parts by weight polymer (php) and about 1 php Chromothol Red BR (Color Index, Pigment Red 144), added as a color concentrate. A series of compositions was prepared as described above which also included one or more stabilizers selected from among dioctyl phosphite (DOPI), distearyl thiodipropionate (DSTDP), trilauryl thithiophosphite (TLTTP), and distearyl pentaerythritol diphosphite (DSPDP). Each composition was converted into 18 denier per filament (dpf) nominal 4000 denier crimped tow by using conventional spinning, plying, drawing, and crimping practices and samples of the tow were exposed in a carbon arc Fade-Ometer modified by the addition of 8 fluorescent sunlamps. Duplicate samples of each composition were periodically withdrawn and the decrease in tenacity measured at that exposure time. A comparison of the relative stability of each composition was then determined by the hours exposure required to reach an arbitrary tenacity value of 1 gram per denier (gpd). The composition of each sample and the exposure hours needed to attain 1 gpd are given in Table I.

TABLE I

| INTERACTION OF STABILIZERS IN FIBER SAMPLES | | | | | |
|---|---|---|---|---|---|
| Run No. | Stabilizer, php | | | | Exposure Hours To 1 gpd |
| | 4-HBI | DSPDP | TLTTP | DOPI | DSTDP | |
| 1 | 0.12 | 0 | 0 | 0 | 0 | 58 |
| 2 | 0.12 | 0 | 0 | 0.10 | 0 | 70 |
| 3 | 0.12 | 0.12 | 0 | 0 | 0 | 86 |
| 4 | 0.12 | 0.25 | 0 | 0 | 0 | 75 |
| 5 | 0.12 | 0 | 0 | 0 | 0.25 | 63 |
| 6 | 0.12 | 0 | 0.25 | 0 | 0 | 91 |
| 7 | 0.12 | 0.25 | 0 | 0 | 0.25 | 84 |
| 8 | 0.12 | 0 | 0.25 | 0 | 0.25 | 88 |
| 9 | 0.12 | 0 | 0.25 | 0.10 | 0 | 79 |
| 10 | 0.12 | 0.25 | 0.25 | 0 | 0 | 108 |

Inspection of the data presented in Table I shows that increased stability results by including 1 or more stabilizers with 4-HBI. Runs 2 and 3 show that DSPDP is more effective than DOPI at about the same concentration. However, run 4 shows that doubling the DSPDP concentration reduces the UV stability somewhat, thus it appears to be more beneficial at a lower level than at a higher level. Run 5 indicates that DSTDP is not as effective as a similar concentration of DSPDP in the binary stabilizer compositions. In comparing runs 4, 5 and 6, it can be seen that the binary combination including TLTTP (run 6) gives the best results. Runs 8 and 9 show that the addition of either DSTDP or DOPI to the run 6 composition actually decreases UV stability. Only when DSPDP is added as in run 10 does a substantial increase in UV stability result. Run 7 shows that DSTDP cannot be substituted for TLTTP in the ternary stabilizer formulations if maximum UV stability is to be achieved.

EXAMPLE 2

Another series of pigmented and stabilized compositions was prepared in view of the results obtained in run 10 of Table I. In this series, relatively high-low combinations of the three additives were employed. Each composition was converted into 18 dpf nominal 4000 denier crimped tow and exposed to UV light as in Example 1. However, an electrical malfunction during some of the runs resulted in non-operation of the fluorescent sunlamps. Thus, results obtained without sunlamps were mathematically converted to the corresponding values (normalized) that would be expected if the sunlamps were in operation. This was done by multiplying the results of each of those runs by the factor 0.75. This value was obtained by ratioing the hours to 1 gpd for three samples exposed under the two conditions (runs 1, 11 and 12). Thus, 77/93=0.83, 127/171=0.74, 132/195=0.68, 0.83+0.74+0.68/3=0.75. The concentrations of stabilizers employed and exposure hours required to reach 1 gpd are presented in Table 2.

systems containing known UV stabilizers of either the nickel type or/and UV screener type indicated that UV stability was impaired by the addition of a colorant,

TABLE 2

STABILIZER FORMULATION RESULTS

| Run No. | 4-HBI | DSPDP | TLTTP | Weight Ratio 4-HBI/DSPDP/TLTTP | Exposure Hours to 1 gpd No Sunlamp | Exposure Hours to 1 gpd With Sunlamp | Normalized | Other Additives, php |
|---|---|---|---|---|---|---|---|---|
| 1 | 0.12 | 0.12 | 0.10 | 1/1/0.83 | 93 | 77 | 70 | 0.05 Ca stearate |
| 2 | 0.12 | 0.12 | 0.25 | 1/1/2.1 | — | 80 | — | 0.05 Ca stearate |
| 3 | 0.12 | 0.25 | 0.10 | 0.48/1/0.4 | — | 74 | — | 0.05 Ca stearate |
| 4 | 0.12 | 0.25 | 0.25 | 0.48/1/1 | — | 86 | — | 0.05 Ca stearate |
| 5 | 0.25 | 0.05 | 0.10 | 5/1/2 | 240 | — | 180 | none |
| 6 | 0.25 | 0.10 | 0.10 | 2.5/1/1 | 185 | — | 139 | none |
| 7 | 0.25 | 0.10 | 0.25 | 2.5/1/2.5 | 156 | — | 117 | none |
| 8 | 0.25 | 0.05 | 0.10 | 5/1/2 | 211 | | 159 | 0.05 Ca stearate |
| 9 | 0.25 | 0.10 | 0.10 | 2.5/1/1 | 193 | | 145 | 0.05 Ca stearate |
| 10 | 0.25 | 0.18 | 0.18 | 1.4/1/1 | — | 112 | — | none |
| 11 | 0.25 | 0.25 | 0.25 | 1/1/1 | 171 | 127 | 128 | none |
| 12 | 0.40 | 0.12 | 0.10 | 3.3/1/0.83 | 195 | 132 | 146 | 0.05 Ca stearate |
| 13 | 0.40 | 0.12 | 0.25 | 3.3/1/2.1 | — | 137 | — | 0.05 Ca stearate |
| 14 | 0.40 | 0.25 | 0.25 | 1.6/1/1 | — | 118 | — | 0.05 Ca stearate |
| 15 | 0.40 | 0.25 | 0.25 | 1.6/1/1 | — | 109 | — | none |

Inspection of the data given in Table 2 indicates that the UV stability of the fiber samples is dependent upon the concentration of 4-HBI and of the relative concentrations of DSPDP and TLTTP. The effect of increasing 4-HBI content at similar low levels of DSPDP and TLTTP is shown in runs 1, 6, 9 and 12. The results show it is advantageous to increase the 4-HBI content from 0.12 php to a higher level, i.e., 0.25 php, but thereafter a leveling effect appears to be present, i.e., 0.40 php is about as effective as 0.25 php. At the three concentrations of 4-HBI employed, comparing the results of runs 1 and 2, 6 and 7, 12 and 13, the data show when keeping the DSPDP concentration at about 0.1 php that there is little advantage to be gained by increasing the TLTTP concentration from about 0.1 php to about 0.25 php. The results of runs 1–4 show there is no advantage to be gained in increasing the concentration of DSPDP from about 0.1 php (run 1) to about 0.25 php (run 3) at low levels of TLTTP. Run 4 indicates that relatively little advantage is gained by increasing both DSPDP and TLTTP from about 0.1 php to about 0.25 php. At a 4-HBI concentration of about 0.25–0.4 php, the results of runs 5–15 indicate that the best results are obtained when the DSPDP level ranges between about 0.05–0.15 php and the weight ratio of 4-HBI/DSPDP/TLTTP ranges from about 2-6/1/0.8-3, most preferably about 5/1/2.

The effects of various colorants added to the stabilized resin compositions of this invention on UV stability was determined also. Earlier work with stabilizer systems containing known UV stabilizers of either the nickel type or/and UV screener type indicated that UV stability was impaired by the addition of a colorant, excluding carbon black, to the compositions. By nickel type stabilizer is meant nickel complexes, e.g., nickel amine complexes of 2,2'-thiobis-4-alkylphenols and the like. By UV screener type is meant those UV stabilizers containing no metal atoms, e.g., substituted hydroxybenzophenones, substituted benzotriazoles, and the like.

EXAMPLE 3

Various pigmented and stabilized polypropylene compositions were prepared, converted into 18 dpf yarn, and tested as before. Each composition contained 0.1 php DOPI and 0.05 php calcium stearate. A phenolic antioxidant was employed in each instance. Antioxidant 1 (AO-1) was octadecyl[3-(3,5-di-t-butyl-4-hydroxyphenyl)]proprionate, AO-2 was di-n-octadecyl(3,5-di-t-butyl-4-hydroxybenzyl)phosphonate and AO-3 was 2,4-bis(4-hydroxy-3,5-di-t-butyl-phenoxy)-6-(n-octylthio)-1,3,5-triazine. Some compositions also contained DLTDP, dilauryl thiodipropionate. Nickel 1 stabilizer was [2,2'-thiobis(4-t-octylphenolato)]-n-butylamine-nickel(II). Nickel 2 stabilizer was bis[2-(2-hydroxy-5-t-octylthiophenol)-4-t-octylphenolato]nickel(II).

Screener 1 stabilizer was 2-hydroxy-4-n-octoxybenzophenone. Screener 2 stabilizer was 2-(2'-hydroxy-3',5'-di-t-amylphenyl)-benzotriazole. The pigments and stabilizer systems employed and results obtained are given in Tables 3A and 3B. Each pigment was employed at about 1 php and was used in the form of a color concentrate.

TABLE 3A

UV STABILITY OF UV STABILIZED PIGMENTED YARN

| Run No. | Colorant Color Index No. | UV Stabilizer Type | Concentration (php) | Exposure Hours To 1 gpd | Yarn Denier[e] | Stabilizer System |
|---|---|---|---|---|---|---|
| 1 | — | Nickel 1 | 1.9 | 1060 | 282 | a |
| 2 | Pigment Red 144 | Nickel 1 | 1.9 | 560 | 304 | a |
| 3 | Rutile TiO$_2$, Pigment White 6 | Nickel 1 | 1.9 | 720 | 307 | a |
| 4 | — | Screener 1 | 2.0 | 485 | 295 | b |
| 5 | Pigment Red 144 | Screener 1 | 2.0 | 320 | 299 | b |
| 6 | Pigment White 6 | Screener 1 | 2.0 | 365 | 283 | b |

Notes:
[a] In php: AO-1, 0.02.
[b] In php: AO-2, 0.15; DLTDP, 0.3.
[c] 18 dpf yarn.

TABLE 3B

UV STABILITY OF UV STABILIZED PIGMENTED YARN

| Run No. | Colorant Color Index No. | UV Stabilizer Type | Concentration (php) | Exposure Hours To 1 gpd | Yarn Denier[e] | Stabilizer System |
|---|---|---|---|---|---|---|
| 7 | Pigment Red 144 | Nickel 1 | 1.9 | 660 | 4255 | c |
| 8 | Pigment White 6 | Nickel 1 | 1.9 | 860 | 4355 | c |
| 9 | Pigment Red 144 | Screener 1 | 2.0 | 290 | 4210 | b |
| 10 | Pigment White 6 | Screener 1 | 2.0 | 605 | 4170 | b |
| 11 | Pigment Red 144 | Screener 2 | 1.3 | 190 | 4240 | b |
| 12 | Pigment White 6 | Screener 2 | 1.3 | 355 | 3945 | b |
| 13 | Pigment Red 144 | Nickel 2, Screener 1 | 1.5, 0.5 | 430 | 4255 | d |
| 14 | Pigment White 6 | Nickel 2, Screener 1 | 1.5, 0.5 | 515 | 4170 | d |

Notes:
[b] In php: AO-2, 0.15; DLTDP, 0.3.
[c] In php: AO-1, 0.02; DLTDP, 0.3
[d] In php: AO-3, 0.07; DLTDP, 0.7.
[e] 18 dpf yarn.

Pigmented yarns of various deniers are shown in Tables 3A and 3B. The results presented in Table 3A show that regardless of UV stabilizer type employed, the best results are obtained in the absence of a pigment and that pigment red 144 is more deleterious than pigment white 6 on UV stability. The pigmented yarns of heavier denier shown in Table 3B also illustrate the same trends shown in Table 3A with the white and red pigments. Although unpigmented controls were not made, it is likely they would also be superior to the pigmented fibers in UV stability based on Table 3A results.

EXAMPLE 4

Pigmented compositions were prepared and tested in the manner set forth in Example 1. Each composition, however, contained 0.25 php 4-HBI, 0.05 php DSPDP, 0.10 php TLTTP and 0.05 php calcium stearate as the stabilizer system. All fibers were exposed in the form of 18 dpf nominal 4000 denier crimped tow. The pigments employed and results obtained are presented in Table 4.

TABLE 4

UV STABILITY OF PIGMENTED CRIMPED TOW

| Run No. | Colorant Color Index No. | Concentration (php) | Exposure Hours To 1 gpd |
|---|---|---|---|
| 1 | — | none | 128 |
| 2 | Pigment White 6 | 0.15 | 180 |
| 3 | Pigment Red 144 | 0.5 | 210 |
| 4 | Pigment Red 194 | 0.63 | 185 |
| 5 | Pigment Red 104 | 1.0 | 348 |
| 6 | Pigment Yellow 83 | 0.38 | 168 |
| 7 | Pigment Yellow 34 | 1.0 | 264 |
| 8 | Pigment Blue 15 | 0.63 | 312 |

The results in Table 4 show that pigmented fibers containing the stabilizer system of this invention are most resistant to UV radiation than the unpigmented control fibers. Pigments employed include the white and red shown to be deleterious in Example 3 as well as several others that are commonly used.

EXAMPLE 5

Pigmented, stabilized compositions employing 12 melt flow polypropylene were prepared and converted into 18 dpf nominal 4000 denier crimped tow as described before. The amount of colorant employed in each composition was about 1 php. Each composition contained 0.25 php 4-HBI, 0.05 php DSPDP, 0.1 php TLTTP and 0.05 php calcium stearate as the stabilizer system. In addition, several of the compositions also contained bis(4-t-butyl-3-hydroxy-2,6-dimethylbenzyl)-dithiolterephthalate as the thiomethylenephenol stabilizer. One portion of each tow was heat treated at 110° C. in an oven for a specified time. All tow samples were then exposed as before. The results are presented in Table 5.

TABLE 5

UV STABILITY OF STABILIZED[1], PIGMENTED CRIMPED TOW

| Run No. | Concentration (php) Thiomethylenephenol[2] | Colorant in 4,000 Denier Crimped Tow | Exposure Hours To 1 gpd | | Ratio |
|---|---|---|---|---|---|
| | | | Not Heat Treated | Heat Treated | |
| 1 | 0 | Pigment Blue 15 | 200 | 110[3] | 0.55 |
| 2 | 0.05 | Pigment Blue 15 | 209 | 165[3] | 0.79 |
| 3 | 0 | Pigment Red 144 | 150 | 116[4] | 0.77 |
| 4 | 0.05 | Pigment Red 144 | 116 | 111[4] | 0.96 |
| 5 | 0.10 | Pigment Red 144 | 103 | 107[4] | 1.03 |

Notes:
[1] - .25 php 4-HBI, .05 php DSPDP, .10 php TLTTP, .05 php Ca stearate
[2] - bis(4-t-butyl-3-hydroxy-2,6-dimethylbenzyl)dithiolterephthalate
[3] - 30 minutes at 110° C.
[4] - 45 minutes at 110° C.

Table 5 points out that pigmented, crimped tow which has been stabilized with a combination of tris(4-hydroxybenzyl) isocyanurate, substituted pentaerythritol phosphite, and thiophosphite (as shown in runs 1 and 3) exhibit enhanced ultraviolet stabilization upon heat treatment upon the addition of a thiomethylenephenol (runs 2, 4 and 5). In each of runs 2, 4 and 5 the ratio of exposure hours to 1 gpd for heat treated as compared to not heat treated tow is greater than for the comparable ratio of runs 1 and 3.

In summary, the stabilizing system of this invention is an effective stabilizer package for polypropylene. The stabilized resin can be characterized as a general purpose polypropylene which has medium UV stability and which can be pigmented to provide colored compositions exhibiting even greater UV stability than the natural stabilized resin.

I claim:

1. A multi-component ultraviolet stabilizer system for pigmented polyolefin comprising a tris-(4-hydroxybenzyl) isocyanurate, a substituted pentaerythritol diphosphite, a trihydrocarbyl thiophosphite, and a thiomethylenephenol.

2. A stabilizer system of claim 1 wherein said substituted pentaerythritol diphosphite is described by the generic formula:

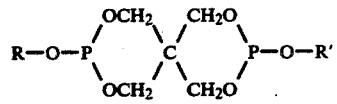

where R and R' are the same or different and are selected from the group consisting of alkyl, cycloalkyl, aryl, alkoxyalkyl, the halo-substituted derivatives thereof containing from 1 to 20 carbon atoms and combinations thereof such as aralkyl, alkaryl, and the like, and said trihydrocarbyl thiophosphite is described by the generic formula:

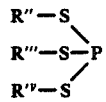

wherein R", R'" and R'$^v$ are the same or different alkyl, cycloalkyl or aryl groups contaning from 1–20 carbon atoms per molecule and combinations thereof such as aralkyl.

3. A stabilizer system of claim 1 wherein the amount of said tris-(4-hydroxybenzyl)isocyanurate is in the range of about 0.10 to about 0.60 parts by weight per 100 parts by weight polymer, said diphosphite is in the range of 0.02 to about 0.3 parts by weight per 100 parts by weight polymer, said thiophosphite is in the range of about 0.02 to about 0.3 parts by weight per 100 parts by weight polymer, and said thiomethylenephenol is present in the amount of about 0.02 to about 0.2 parts by weight per 100 parts by weight polymer.

4. A stabilizer system of claim 1 wherein said tris-(4-hydroxybenzyl)isocyanurate is tris-(3,5-di-t-butyl-4-hydroxybenzyl)-isocyanurate, said substituted pentaerythritol diphosphite is 3,9-di(octadecyloxy)-2,4,8,10-tetraoxa-3,9-diphosphaspiro[5,5]undecane, said thiophosphite is trilauryl trithiophosphite, and said thiomethylenephenol is bis(4-t-butyl-3-hydroxy-2,6-dimethylbenzyl)dithiolterephthalate.

5. A stabilized, pigmented polyolefin composition comprising a stabilizing amount of a tris-(4-hydroxybenzyl)isocyanurate, a substituted pentaerythritol diphosphite, and a trihydrocarbyl thiophosphite.

6. A stabilized, pigmented polyolefin composition of claim 5 comprising a stabilizing amount of tris-(3,5-di-t-butyl-4-hydroxybenzyl)isocyanurate, 3,9-di(octadecyloxy)-2,4,8,10-tetraoxa-3,9-diphosphaspiro[5,5]undecane, and trilauryl trithiophosphite.

7. A stabilized, pigmented pololefin composition comprising a stabilizing amount of the multi-component stabilizing system of claim 1.

8. A stabilized, pigmented polyolefin composition comprising a stabilizing amount of the multicomponent stabilizing system of claim 4.

9. A method for stabilizing a pigmented polymer of propylene, said method comprising thoroughly combining into said polymer a stabilizing system of claim 1.

10. A stabilized, pigmented polyolefin composition of claim 5 wherein said polyolefin is polypropylene.

11. A stabilized, pigmented polyolefin composition of claim 6 wherein said polyolefin is polypropylene.

12. A stabilized, pigmented polyolefin composition of claim 7 wherein said polyolefin is polypropylene.

* * * * *

UNITED STATES PATENT AND TRADEMARK OFFICE
CERTIFICATE OF CORRECTION

PATENT NO. : 4,185,004

DATED : January 22, 1980

INVENTOR(S) : Ronald D. Mathis

It is certified that error appears in the above-identified patent and that said Letters Patent are hereby corrected as shown below:

Column 10, line 23, "pololefin" should be --- polyolefin ---.

Signed and Sealed this

Twenty-fourth Day of June 1980

[SEAL]

Attest:

SIDNEY A. DIAMOND

Attesting Officer

Commissioner of Patents and Trademarks